United States Patent
Mackiewicz

(10) Patent No.: US 6,928,813 B1
(45) Date of Patent: Aug. 16, 2005

(54) STROKE GAIN DEVICE FOR A MASTER CYLINDER

(75) Inventor: John Edmund Mackiewicz, Niles, MI (US)

(73) Assignee: Robert Bosch Corporation, Broadview, IL (US)

( * ) Notice: Subject to any disclaimer, the term of this patent is extended or adjusted under 35 U.S.C. 154(b) by 95 days.

(21) Appl. No.: 10/651,268

(22) Filed: Aug. 28, 2003

(51) Int. Cl.$^7$ .............................................. B60T 11/08
(52) U.S. Cl. ......................................... 60/574; 60/594
(58) Field of Search ................................... 60/574, 594

(56) References Cited

U.S. PATENT DOCUMENTS 6,282,896 B1 * 9/2001 Wachi et al. ................. 60/574

* cited by examiner

*Primary Examiner*—Edward K. Look
*Assistant Examiner*—Michael Leslie

(57) ABSTRACT

A master cylinder wherein an input force applied to a bearing assembly pushes and rotates an input piston into a bore of a housing through the engagement between a helical groove on its outer surface and a pin on the housing to act on a primary piston in the bore that supplies pressurized fluid to wheel brakes. A threaded connection that connects the input piston to a primary master cylinder piston has an opposite direction thread from that of the helical groove in the input piston and as a result the input piston moves at a different rate of travel within the bore than the primary piston such that initial movement of the input piston is accentuated in the movement of primary piston and after a predetermined travel of the input piston into the bore, the input piston and primary piston travel in unison to effect a brake application.

11 Claims, 3 Drawing Sheets

STROKE GAIN DEVICE FOR A MASTER CYLINDER

A master cylinder for use in a vehicle hydraulic braking systems having an initial high gain between movement of an input member and a primary piston and after a predetermined movement of the input member within a housing the input member and primary piston move at a same rate to pressurize fluid that is use to effect a brake application.

BACKGROUND OF THE INVENTION

At the beginning of a brake apply, the fluid displaced out of the master cylinder is used to bring the brake friction material in contact with the brake rotors or drums. This take-up of running clearances is basically lost travel from a pedal feel standpoint. It is desirable to reduce this initial pedal travel and thus to improve pedal feel.

This problem has been recognized in the prior art. For example, U.S. Pat. No. 4,338,787 achieves rapid low force motion of braking members into engagement followed by significantly higher force braking pressure by employing multiple fluid chambers and two dissimilar piston areas, a larger one of which is effective to move fluid and translate the braking members into engagement whereupon a hydraulic valving arrangement causes the master cylinder to transition to using the smaller area piston applying a greater force to the braking surfaces.

SUMMARY OF THE INVENTION

The present invention provides a mechanical coupling within a master cylinder to achieve initially greater motion at a lesser force to engage braking members followed by the application of a greater force with a corresponding lesser movement for braking the vehicle. From elementary physics, the mechanical advantage of a simple machine is the ratio of the magnitude of the force coming out to the force going in. In the present invention, initial motion is at a mechanical advantage less than one while the subsequent greater force is applied, neglecting frictional losses, with a mechanical advantage of one.

The invention comprises, in one form thereof, a brake system having a plurality of wheel brakes each comprising normally spaced apart braking members and a hydraulic actuator which is responsive to pressure fluid to move the braking members into engagement to impede wheel rotation, and a master cylinder which, upon operator actuation, communicates brake actuating pressurized fluid to the wheel brakes. The master cylinder includes a housing with an axial bore and an operator actuable input member which engages a primary piston reciprocably disposed within the housing bore. The primary piston is axially spaced from the input member and defines, in conjunction with the housing bore, a pressure chamber for supplying pressurized fluid to individual wheel hydraulic actuators. A variable length coupling extends between the input member and primary piston and has a length determined by the axial location of the input member. This coupling may take the form of a threaded coupling the length of which is controlled by the axial location of the input piston. In one preferred form, the input member comprises an input piston which is reciprocably disposed within the housing bore, and an arrangement within housing and coupled to the input piston for constraining the input piston to initial combined rotary and axial motion and to subsequent axial motion only. The length of the variable length coupling may increase during an initial portion of input piston axial motion to diminish the spacing between the braking members and subsequently remain constant during a second portion of input piston axial motion as increasing braking force is applied. Rotary motion of the input piston varies the axial separation between the input piston and the primary piston by way of the threaded coupling.

Also in general, a vehicle braking system of the type having a master cylinder including a housing with an annular bore and a primary piston reciprocably disposed within the housing bore to supply brake actuating pressure fluid to individual wheel brakes is operated by applying an input force to the master cylinder and initially translating the input force into a force on the primary piston to move the piston and displace pressure fluid from the bore to the individual wheel brakes with a mechanical advantage less than one. Subsequently, the input force is translated into a force on the primary piston to move the piston and displace additional pressure fluid from the bore to the individual wheel brakes with a mechanical advantage substantially equal to one. The mechanical advantage may be caused to vary during the initially translating step. Further, The step of initially translating may combine translational and rotational movement of an input piston with the step of subsequently translating including subjecting the input piston to rotation-free translation.

An advantage of the present invention is that "pedal feel" from the vehicle operator's perspective is improved.

Another advantage of the present invention is that the running gap or brake clearance between braking members is quickly diminished upon operator actuation of the brake pedal.

BRIEF DESCRIPTION OF THE DRAWINGS

Corresponding reference characters indicate corresponding parts throughout the several drawing views.

DETAILED DESCRIPTION OF THE INVENTION

Figure 1:
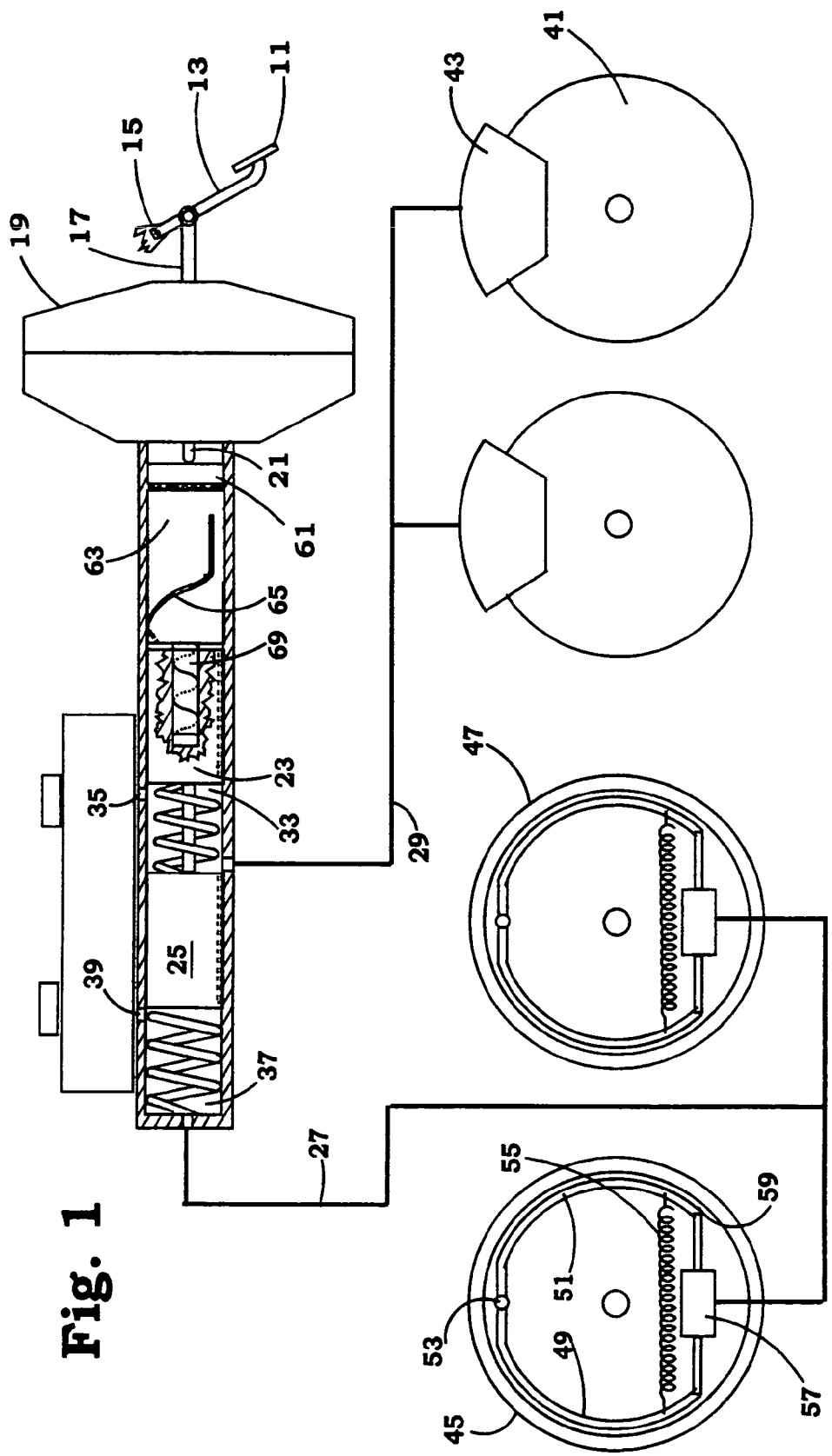
FIG. 1 is a schematic illustration of a vehicle braking system incorporating the invention in one form.
Figure 2:
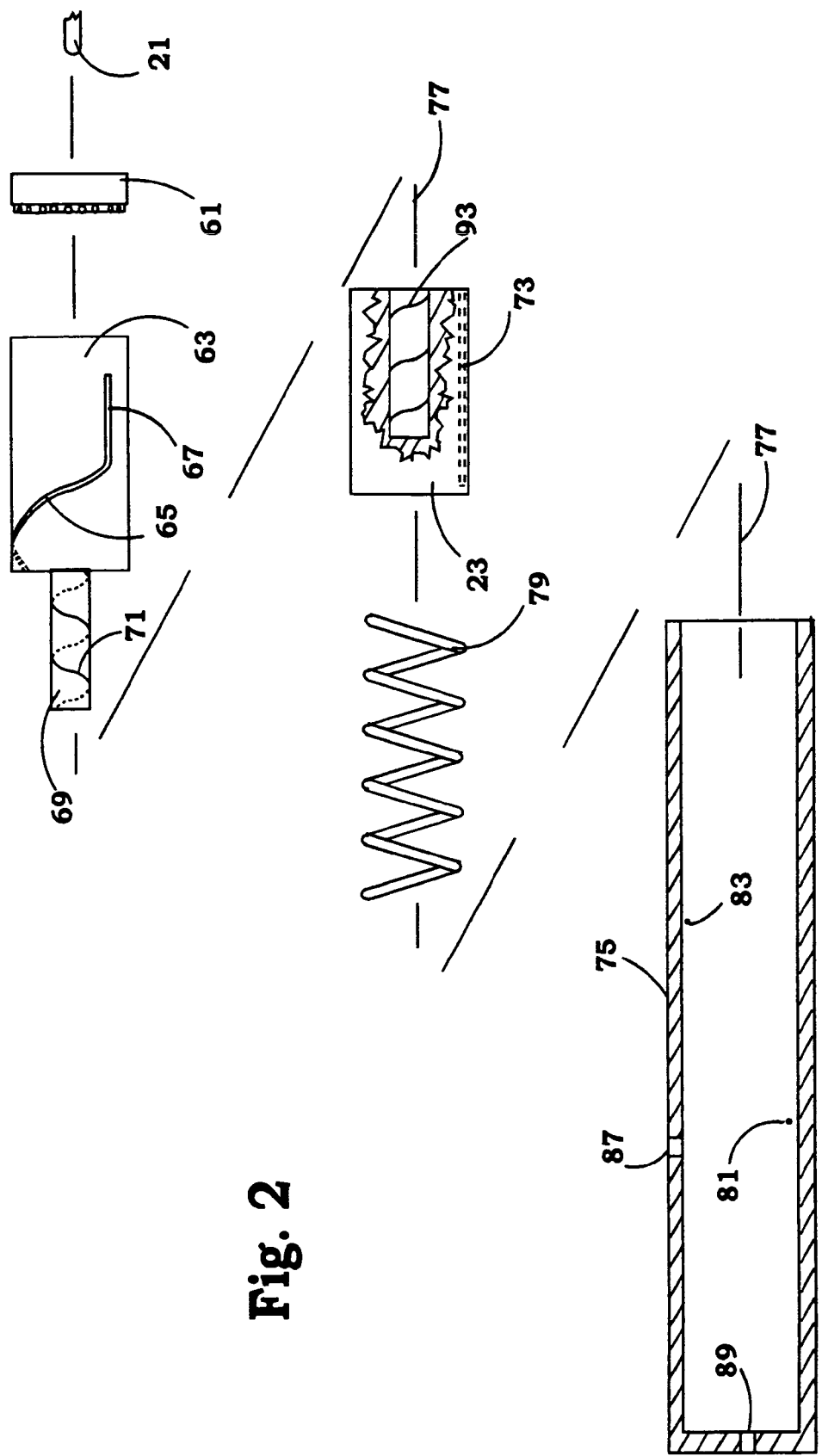
FIG. 2 is an exploded view partially in cross section, of a simplified master cylinder similar to that shown in FIG. 1.

Referring now to the drawings and in particular FIG. 1 wherein a master cylinder 9 according to the present invention is shown in a conventional braking system 100. An operator actuable brake pedal 11 located near one end of an arm 13 is pivotable about fulcrum 15 to move a push rod 17 toward and away from a vacuum booster chamber 19. A piston rod or push rod 21 extends from the vacuum booster chamber 19 to provide a boosted actuating force to move pistons 23 and 25 located within an axial bore of the master cylinder 9. The master cylinder 9 as shown in FIG. 1 is of the "split" or tandem type wherein separate hydraulic circuits operate two sets of wheel brakes. For illustrative purposes, a set of rear drum brakes are operable by fluid pressure in brake line or conduit 27 while a set of front disc brakes are operable by fluid pressure in brake line 29. A first fluid chamber 31 receives replenish fluid from a reservoir 33 by way of port 35 while replenishing fluid may flow into chamber 37 by way of port 39. Upon brake pedal actuation, ports 33 and 35 are closes as pistons 23 and 25 respectively moves past the ports 33 and 35 to pressurize fluid in chambers 33 and 37 that is supplied from chamber 37 by way of line 27 to apply braking force to the rear drum brakes 46,46' while fluid is supplied from chamber 33 by way of line 29 to actuate the front disc brakes 42,42'. The front disc brakes 42,42' is a simple wheel supported rotor 41 is spanned by a caliper unit 43 while the rear drum brakes 46,46' employ wheel supported drums 45 and 47 that respectively enclose a pair of brake shoes such as 49 and 51. Shoes 49 and 51 are pivotably fixed to the vehicle at pivot 53, urged toward one another by return spring 55 and forced away from one another into engagement with the drum 45 by hydraulic pressure in a double piston wheel cylinder 57. Normally, the return spring 55 retains the shoes 49 and 51 to define a running clearance 59 between the drum 45 and the shoes 49,51.

During a brake application, initial depression of the brake pedal 11 experiences little opposition since movement of the brake shoes is opposed only by the return spring. When the brake shoes 49,51 engage the drum 46,46, a much greater brake pedal force is required to slow the vehicle. A similar gap or free running space is associated with the disc brakes 42,42' where a hydraulic cylinder of the caliper 43 is actuated by a relatively low fluid pressure to bring the pads on friction members into contact with the rotor 41 before higher pressure is supplied to effect a brake application. Reduction of the dissimilarities between initial pedal depression opposition and actual subsequent braking pedal opposition is accomplished by a mechanical coupling between piston rod 21 and piston 23 which provides an initial travel gain to accentuate primary piston 23 travel relative to an input member such as push rod 21, and subsequent travel of the input member and primary piston in unison. The input arrangement may comprise input piston 63 and input push rod 21 which is responsive to operator input for initially rotating and axially displacing the input piston, a rotary bearing 61 that couples the input push rod 21 with the input piston 63, and a variable length threaded coupling interconnecting the input piston 63 with the primary piston 23 such that the length there between is controlled by the axial location of the input piston 63 within the axial bore. The master cylinder 9 opposition to travel of the input member increases and the travel gain decreases to one as the input member travel increases.

Other such systems may include sets of interleaved axially compressible rotor and stator braking surfaces or other known braking techniques could be employed. As shown in FIG. 1, pistons 23 and 25 are coupled in known fashion to equalize or distribute braking force between the front and rear wheels, but upon failure of either brake circuit, to continue operation of the other brake circuit. For explanation purposes, a more simplistic single circuit braking system having only one replenish port 87 and one port 89 for supplying pressure fluid to all the wheel brakes is illustrated in FIGS. 2–6. The structure of the mechanical coupling between push rod 21 and primary piston 23 is shown more clearly in the exploded view of FIG. 2.

A rotary input bearing assembly 61 having low rotational friction is designed to engage one face of the piston 63. The input bearing assembly uses a rotary bearing to reduce the friction between the input bearing assembly 61 and the input piston 63. This will reduce the input force requirement during the stroke gain portion of the master cylinder 9 stroke. Piston 63 has a helical outer groove 65 that may be either linear or non-linear, shown as about one-half of a complete revolution and wrapped about the cylindrical surface in a right-hand thread sense. At one extreme, the helical groove 65 transitions into an axially extending groove 67. An elongated member such as threaded shaft 69 is fixed to the input piston and threadedly engages the primary piston. Note that the threads 71 wrap about the shaft 69 in a left-hand thread sense, that is, in a rotational sense opposite that of the helical outer groove. A mating left-hand internally threaded 93 hole is provided in the primary master cylinder 9 piston 23. The primary piston 23 includes an axially extending slot or groove 73 along its outer surface. A master cylinder 9 housing 75 has a cylindrical bore extending along axis 77 of a diameter to receive the master cylinder 9 components all of which are urged toward the right as viewed by a return spring 79. Two bosses such as inwardly extending pins 81 and 83 are provided for engaging the axial slot or groove 73 and helical groove 65 respectively. The master cylinder 9 components are co-axially assembled along axis 77 in FIGS. 3–5.

Figure 3:
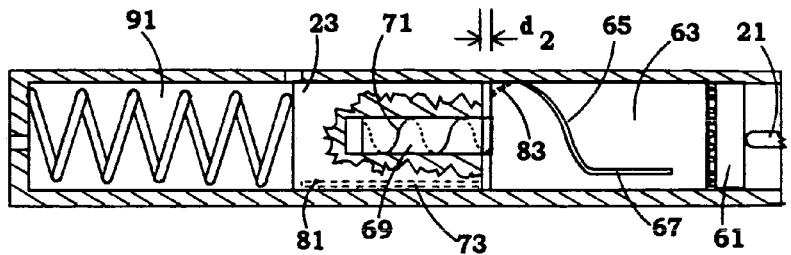
FIG. 3 is a cross-sectional view of the assembled master cylinder of FIG. 2 in a non-braking condition.
Figure 4:
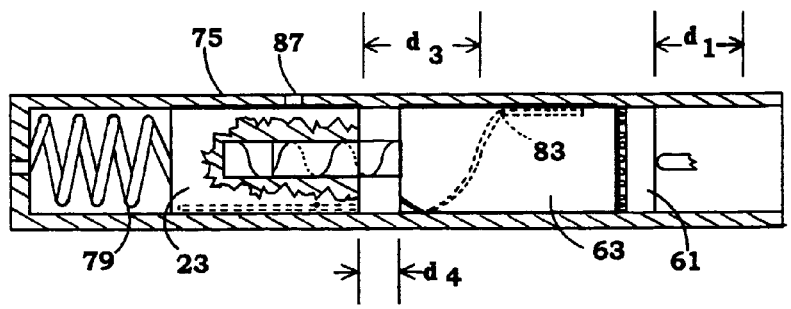
FIG. 4 illustrates the master cylinder of FIG. 3 early in the process of brake actuation.

The master cylinder 9 components are shown in their rest or normal (brakes released) positions in FIG. 3 with the externally threaded shaft 69 extending for several turns (about 2 2 as shown) into the internally threaded hole of the primary piston 23. Here, the pin 83 engages the groove 65 near the leftmost extreme on the rearward side of the input piston as viewed. At the same time, pin 81 engages slot 73 in the primary piston 23. Depression of the foot pedal 11 and accompanying leftward motion of piston rod 21 moves input bearing assembly 61 and the input piston 63 toward the left. From FIG. 3 to FIG. 4, the push rod 21, bearing assembly 61 and the piston 63 move an illustrative distance $d_1$. As it translate the distance $d_1$, the input piston 63 is also forced to rotate about axis 77 by the interaction of pin 83 and helical groove 65, for about one-half revolution as depicted. The shaft 69 rotates by the same amount. Primary piston 23 is, however, prohibited from rotation about the axis by the interaction of pin 81 and axial slot 73. Relative rotation between the piston 23 and shaft 69 when transitioning from FIG. 3 to FIG. 4 is in a sense to cause the separation between the piston 63 and piston 23 to increase from $d_2$ shown in FIG. 3 to a distance $d_4$ shown in FIGS. 3 and 4. Thus, while the input piston moves a distance $d_1$, the primary piston moves a greater distance $d_3$ given by:

$$d_3 = d_1 + (d_4 - d_2),$$

that is, there is a stroke gain where the primary piston moves the input distance plus the enhancement provided by the threaded coupling. The motion is somewhat analogous to that of a class three lever where, at the sacrifice of force (a mechanical advantage less than one), the input motion is less than the output motion.

Figure 5:
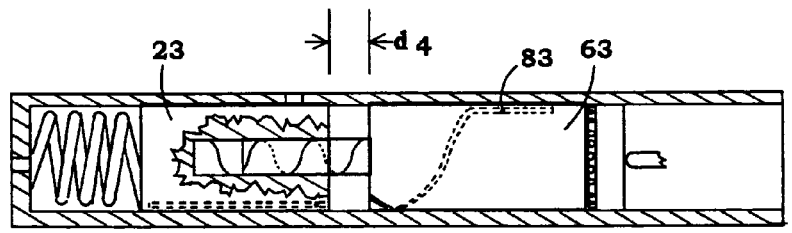
FIG. 5 illustrates the master cylinder of FIGS. 3 and 4 later in the process of brake actuation.
Figure 6:
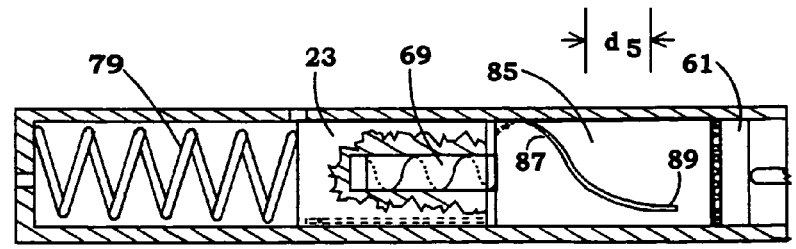
FIG. 6 is a view similar to FIG. 3, but showing a modified form of the present invention.

Comparison of FIGS. 4 and 5 reveals that further leftward motion of the piston rod 21 results in motion of the input bearing assembly 61, input piston 63, and primary piston 23 in unison, that is, with a mechanical advantage of substantially one. This transition is the result of the pin 83 now engaging the linear portion 67 of the piston 63 slot prohibiting further relative rotation between the shaft 69 and primary piston 23. The separation $d_4$ now remains constant for the remaining leftward travel.

As thus far described, the transition from a mechanical advantage (actually a disadvantage) less than one to a mechanical advantage of one is rather abrupt as the portion of the piston 63 groove which engages the pin 83 changes from helical along 65 to linear along 67. The contour of the helical groove can be tailored to provide a smooth transition (variable gain) from the initial stroke gain portion of the stroke to the non stroke gain portion of the stroke. The angle of the groove, together with the pitch of the threaded connection, can be increased or decreased to provide more or less stroke gain. A more gradual blending of these is achieved in FIG. 6 where the helical outer groove 87 of a modified input piston 85 terminates and transitions tangentially into an axially extending groove 89. Here the pitch of the helical outer groove 87 varies to provide a continuous transition from combined rotary and axial motion while the boss 83 engages the helical groove to strictly axial movement while the axially extending groove 89 and boss 83 are engaged. In FIGS. 1–5, the pitch of helical groove 65 remained constant, but in FIG. 6, this pitch gradually increases, for example, along the axial distance $d_5$, as the helical groove gets closer and closer to the linear portion 87.

More precisely, if the input piston 63 helical groove 65 has a pitch (axial distance equivalent to one revolution) $p_1$ and rotates through an angle of θ degrees as the pedal 11 is depressed, the input piston 63 moves axially the distance $d_1$ given by:

$$d_1 = p_1(\theta/360).$$

Similarly, if the threads 71 and 93 have a pitch $p_2$, the primary piston extends from the input piston the distance $(d_4-d_2)$ given by:

$$(d_4-d_2) = p_2(\theta/360).$$

θ is easily eliminated from these two equations yielding:

$$(d_4-d_2) = p_2(d_1/p_1).$$

The total motion of the primary piston 23 is $d_3$ given by:

$$d_3 = d_1 + (d_4-d_2) = d_1 + p_2(d_1/p_1) = d_1(1+p_2/p_1).$$

Moreover, neglecting frictional and other losses, if the input force $f_1$ acts through a distance $d_1$ while the output force $f_3$ on the primary piston acts through the distance $d_3$, the mechanical advantage is:

$$f_3/f_1 = d_1/d_3 = 1/(1+p_2/p_1).$$

The expression in parentheses $(1+p_2/p_1)$ is always greater than one, hence there is a travel gain and mechanical advantage less than one regardless of the particular finite pitch values. As expected, as $p_1$ increases, the fraction $p_2/p_1$ tends to zero, the travel amplification decreases and the mechanical advantage increases toward one. In the limiting case, pitch $p_1$ of the axial segment 67 can be thought of as infinite and the mechanical advantage becomes one, again neglecting frictional losses.

Many vehicle braking systems have an automatic adjust feature which compensates for brake pad or shoe wear. If the adjustment is in discrete steps, the gap or running clearance between braking surfaces just before an adjustment event is greater than the gap just after the adjustment event. The embodiment of FIGS. 1–5 transitions abruptly from a travel gain condition to a mechanical advantage of one. The transition may not always coincide with the time when the gap becomes zero. This is may not be detectable by the vehicle driver, but, in any event, the embodiment of FIG. 6 smooths the transition.

It will be understood that the features of FIGS. 2–6 may be applied to tandem systems such as illustrated in FIG. 1 employing any combination of drum, disc or other braking techniques as well as many other conventional braking systems.

What is claimed is:

1. A master cylinder for use in a hydraulic brake system having a housing with an axial bore therein for receiving a primary piston and an operator actuable input member connected to said primary piston to reciprocate said primary piston within said bore, said primary piston being characterized by moving from a rest position in a direction to apply an increasing hydraulic braking force to effect a brake application; and in that said input member comprises an input piston and a variable length coupling interconnecting said input piston with primary piston, the length of said coupling being controlled by an axial location of the input piston within said bore such that said primary piston has an initial travel gain that accentuates the relative travel of said input piston and that after a predetermined travel said primary piston and said input piston move in unison, said input piston having a boss thereon that engages and moves along a helical outer groove located in said housing such that as opposition to the travel of said input piston increases, the travel gain of the primary piston decreases and the input piston travel increases during a brake application.

2. The master cylinder of claim 1, wherein said variable length coupling includes an elongated member that is fixed to the input piston and threadedly engaged with the primary piston in a rotational sense that is opposite that of the helical outer groove whereby as the input piston rotates, a distance between said input piston and primary piston varies.

3. The master cylinder of claim 2, wherein said helical outer groove terminates and transitions into an axially extending groove whereby as the input piston moves and the boss engages the axially extending groove, input piston rotation ceases and the distance between the input piston and primary piston becomes constant.

4. The master cylinder of claim 3, wherein the housing includes a second boss and the primary piston includes an axially extending groove engaging the second boss to insure the primary piston moves only axially during input piston motion.

5. The master cylinder of claim 1, wherein the helical outer groove terminates and transitions into an axially extending groove, and the pitch of the helical outer groove varies to provide a continuous transition from combined rotary and axial motion while the boss engages the helical groove to strictly axial movement while the axially extending groove and boss are engaged.

6. A master cylinder for use in a hydraulic brake system having a housing with an axial bore therein for receiving a primary piston and an operator actuable input member connected to said primary piston to reciprocate said primary piston within said bore, said master cylinder being characterized by an initial travel of the input member that is accentuated in the travel of said primary piston and subsequently said input member and primary piston travel in unison, said input member comprises an input piston, a master cylinder input push rod responsive to operator input for initially rotating and axially displacing the input piston, a rotary bearing coupling the input push rod and input piston, and a variable length coupling interconnecting the input piston and primary piston, the length of which is controlled by the axial location of the input piston within said axial bore.

7. A brake system having a plurality of wheel brakes each comprising normally spaced apart braking members and hydraulic actuators responsive to pressurized fluid for moving the braking members into engagement with a rotating member to impede wheel rotation; and a master cylinder which upon operator actuation communicates brake actuating pressurized fluid to the wheel brakes, said master cylinder comprising:

a housing having an axial bore;

an operator actuable input member defined by a input piston reciprocably disposed within said bore;

a primary piston reciprocably disposed within the axial bore of the housing and axially spaced from the input member, said primary piston and axial bore of the housing defining a pressure chamber for supplying pressurized fluid to individual hydraulic actuators;

a variable length coupling located between said input piston and said primary piston having a length that varies and is determined by an axial location of said input member within said axial bore; and means located within said axial bore and connected to said input piston for constraining said input piston to provide for initial combined rotary and axial motion of the input piston and after a predetermined movement of said input piston within said axial bore to only subsequent axial motion.

8. The brake system of claim 7, wherein the length of the variable length coupling increases during initial input piston combined rotary and axial motion to diminish the spacing between the braking members and subsequently remains constant during subsequent input piston axial motion as increasing braking force is applied.

9. The brake system of claim 7, wherein the input piston includes a helical threaded annular surface and a threaded member extending axially to threadedly engage the primary piston, the rotational sense of the helical groove being opposite the rotational sense of the threaded member.

10. A brake system having a plurality of wheel brakes each comprising normally spaced apart braking members and hydraulic actuators responsive to pressure fluid for moving the braking members into engagement with rotating members to impede wheel rotation, and a master cylinder which upon operator actuation communicates brake actuating pressurized fluid to the wheel brakes, said master cylinder comprising;

a housing having an axial bore;

an operator actuable input member defined by a input piston reciprocably disposed within said axial bore;

a primary piston reciprocably disposed within the axial bore of said housing and axially spaced from the input member, said primary piston and axial bore in said housing defining a pressure chamber for supplying pressurized fluid to individual hydraulic actuators; and a variable length coupling located between said input piston and said primary piston having a length that varies and is determined by an axial location of said input member within said axial bore, said length of said coupling increasing during an initial portion of input piston axial motion within said axial bore for moving said primary piston to pressurize fluid in said pressure chamber and supply pressurize fluid to diminish a spacing between the braking members and rotating members and subsequently said length remains constant during a second portion of said input piston axial motion as increasing braking force is applied by said braking members to said rotating members.

11. The brake system of claim 10, wherein, the input member comprises an input piston, a master cylinder input push rod responsive to operator input for initially rotating and axially displacing the input piston, a rotary bearing coupling the input push rod and input piston, and a variable length coupling interconnecting the input piston and primary piston the length of which is controlled by the axial location of the input piston.

* * * * *